United States Patent [19]
Ernst

[11] 3,783,593
[45] Jan. 8, 1974

[54] PLANT CUTTING APPARATUS

[76] Inventor: Arnold E. Ernst, Wolverton, Minn. 56594

[22] Filed: June 12, 1972

[21] Appl. No.: 261,878

[52] U.S. Cl. .................................. 56/14.4, 56/222
[51] Int. Cl. ............................................ A01d 45/02
[58] Field of Search .................. 56/14.3, 10.8, 11.9, 56/153, 158–160, 219–227, 2, 14.4

[56] References Cited
UNITED STATES PATENTS

| | | | |
|---|---|---|---|
| 3,336,735 | 8/1967 | Schoenwald | 56/10.8 |
| 3,613,336 | 10/1971 | Smith | 56/2 |
| 1,958,405 | 5/1934 | Anthony et al. | 56/10.9 |
| 2,588,003 | 3/1952 | Holmes | 56/10.9 |
| 660,555 | 10/1900 | Brackebush | 56/222 |
| 3,208,208 | 9/1965 | Schatz | 56/221 |
| 1,917,352 | 7/1933 | Apel | 56/14.4 |
| 2,071,844 | 2/1937 | Korsmo et al. | 56/14.4 |
| 2,681,537 | 6/1954 | Heth et al. | 56/14.4 |
| 2,696,703 | 12/1954 | Kucera | 56/14.4 |

Primary Examiner—Russell R. Kinsey
Attorney—H. Robert Henderson et al.

[57] ABSTRACT

A plant cutting apparatus adapted for mounting to a self-propelled vehicle. The apparatus having a frame connected to the forward portion of the vehicle, a cutter bar including a reciprocal blade disposed transversely to the direction of movement of the vehicle, a first motor for operating the blade and adapted to selectively adjust the speed of movement of the blade, a rotatable reel to comb the plants toward the cutter bar, a second motor selectively operable to control the speed of rotation of the reel, and an adjusting unit interconnecting the vehicle and frame to adjustably fix the height of the cutter bar relative to the ground.

3 Claims, 6 Drawing Figures

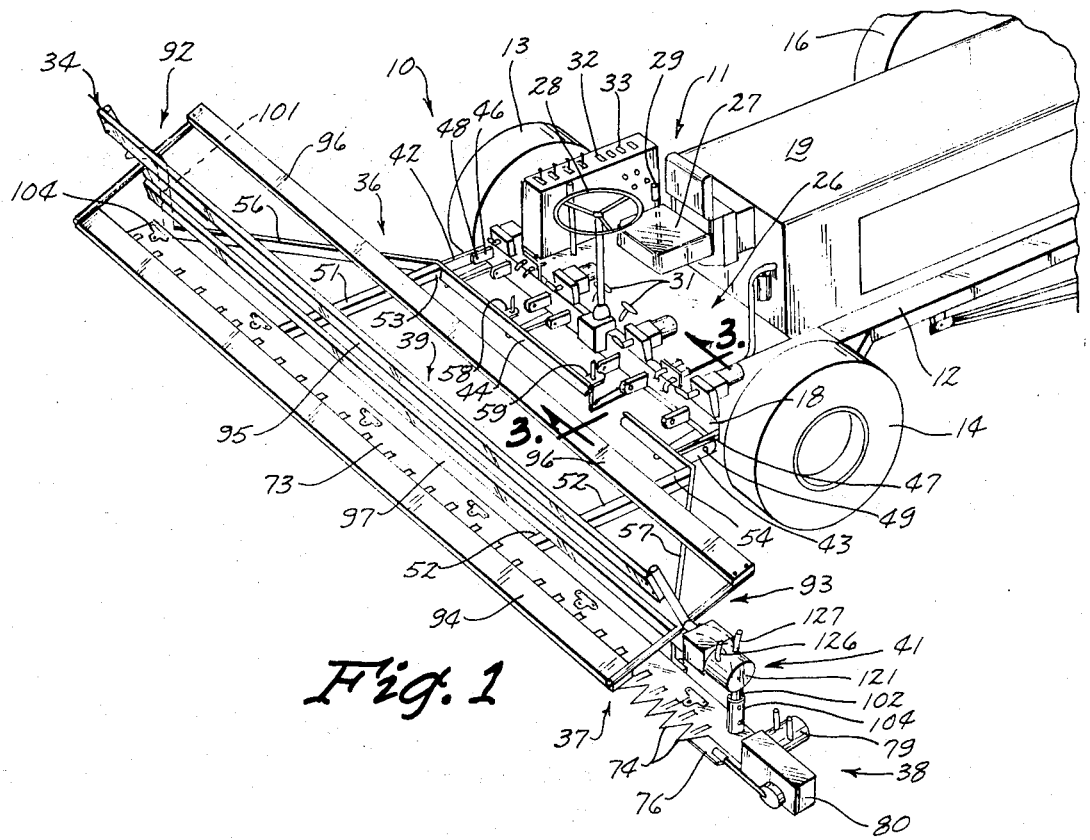

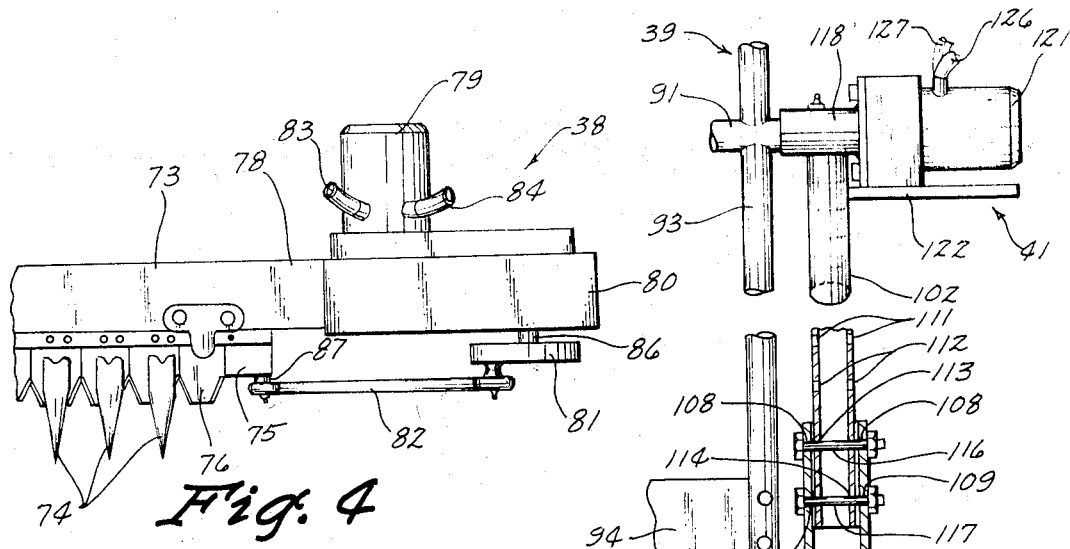
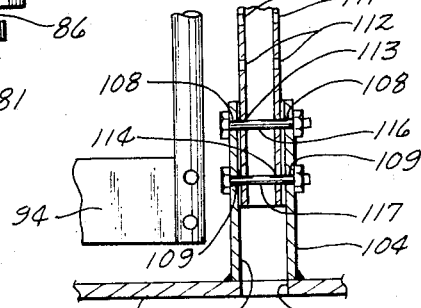
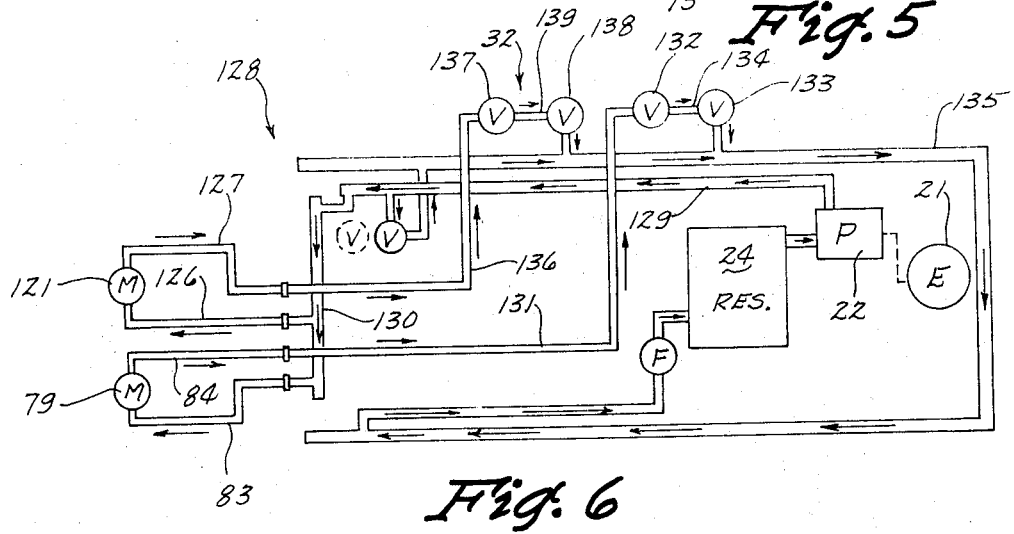

PLANT CUTTING APPARATUS

BACKGROUND OF THE INVENTION

This invention relates generally to plant cutters and more particularly to a cutting apparatus for topping weeds growing in a row crop planted field.

Many crops, i.e., soy beans, are plagued by large weeds growing voluntarily in the rows, which weeds must normally be removed manually owing to the manner in which these crops are planted in continuous, unbroken rows. Among the most common weeds are volunteer corn, milk weed and sunfolower plants. If these undesired plants are allowed to grow unhampered they are harvested with the crop resulting in a lower price or dockage to the farmer for the crop. In addition, the eventually harvested crop is substantially diminished in quality.

During the early stages of growth of the crop, the weeds growing between the rows may be removed by a cultivator. However, as the crop grows, the weeds growing immediately adjacent to or in the planted rows soon become apparent by their faster rate of growth relative to the rate of growth of the crop.

It is an accepted fact among botanists that certain plants may be eliminated or at least their growth may be inhibited by topping or removing the upper portion of the plant. This invention is designed to remove the tops of faster growing undesired plants appearing in a row crop planted field without effecting the growing crop.

Many plant cutting implements employing a cutter bar are known. Among the most common of these implements are windrowers or combines wherein the cutter bar is positioned adjacent the ground to cut a crop for either heaping the cut plants in a row for later gathering thereof or for harvesting by the combine. Another common implement is the conventional weed or grass cutter attached at one end to a tractor and extended lateral thereof to float along the ground to cut weeds or grass to ground level.

However, all of these cutters are adapted to operate adjacent to the ground and they are unadaptable for use in an elevated position above a growing crop for purposes of topping undesired plants. Heretofore, the only satisfactorily manner of accomplishing the selective removal of these undesired plants growing in the planted crop row was to manually hoe or pull the plants from the ground.

The plant cutting apparatus of this invention is designed to operate a predetermined distance above the ground and a growing crop to top unwanted plants growing in a field among the growing crop. The apparatus is provided with selectively adjustable independent motors to control the rate of speed of the cutting bar and the rate of rotation of the reel to adapt the apparatus for cutting thick or sparsely growing weeds as well as thick or thin stemmed weeds. Unlike a combine or windrower, the apparatus does not include an apron to catch the cut plants and the plants are gravitationally deposited on the ground to wither.

SUMMARY OF THE INVENTION

A plant cutting apparatus for topping undesired plants growing in a field where a row crop is growing, the apparatus adapted for use with a self-propelled vehicle having a forwardly mounted tool bar, the apparatus having a frame pivotally connected to the tool bar, a cutter bar including a reciprocal blade connected to the frame distal to the vehicle and disposed transversely to the direction of travel thereof, a motor capable of variable speeds connected to the cutter bar to reciprocally move the blade, a reel to comb the undesired plants toward the cutter bar, the reel including a pair of adjustable mounting posts disposed at either end thereof interconnecting the frame and reel to adjust the height of the reel relative to the cutter bar, a second motor capable of variable speeds to rotate the reel, and an adjustment unit interconnecting the frame and vehicle to selectively position the cutter bar relative to the growing crop.

It is an object of this invention to provide a cutter for removing undesired plants from a field containing a growing crop.

It is another object of this invention to provide a plant cutter adapted for operation above a planted crop to top or remove fast growing, undesired plants growing among the crop.

It is yet another object of this invention to provide a plant cutter having a cutter bar and blade adapted for variable speeds to facilitate cutting thick stemmed plants as well as regular stemmed plants.

It is still another object of this invention to provide a reel to comb the plants to be cut toward the cutter bar, the reel to comb the plants to be cut toward the cutter bar, the reel being operable by a power source for indendently regulating the speed of rotation of the reel.

It is yet another object of this invention to provide a plant cutting apparatus that is simple to operate, economical to manufacture, and rugged in construction.

These objects and other features and advantages will become readily apparent upon reference to the following description when taken in conjunction with the accompanying drawings.

BRIEF DESCRIPTION OF THE DRAWINGS

FIG. 1 is a perspective view of the plant cutting apparatus of this invention in assembled relation with a prime mover;

FIG. 2 is a reduced side elevational view illustrating its operation in the field;

FIG. 3 is an enlarged sectional view of a manual adjusting unit of the apparatus taken along the line 3—3 in FIG. 2;

FIG. 4 is an enlarged view of a portion of the cutter bar showing the motor unit connected thereto;

FIG. 5 is an enlarged, fragmentary, foreshortened elevational view of the right end of the cutting apparatus as viewed from the front of the apparatus in FIG. 1; and FIG. 6 is a schematic diagram of a hydraulic system for powering the cutter bar and reel elements.

DESCRIPTION OF THE PREFERRED EMBODIMENTS

Referring now to the drawings and particularly to FIGS. 1 and 2, one embodiment of the plant cutting apparatus of this invention is indicated generally by the numeral 10. The plant cutting apparatus 10 includes a self propelled vehicle 11 including a main frame or chassis 12. The chassis 12 is supported by a pair of forwardly mounted drive wheels 13 and 14 and rearwardly mounted steerable wheels 16 (not shown) and 17. A tool bar 18 is connected to the forward end of the chassis 12.

It is to be understood that such terms as "forwardly," "rearwardly," "upper," "lower," etc. are words of convenience, used to more clearly describe the invention with reference to a person facing the direction of vehicle travel and are not to be construed as limiting terms.

An engine enclosure 19 is mounted on the rearward part of the chassis 12 and houses a conventional engine 21 (FIGS. 2 and 6), a pair of hydraulic pumps 22 and 23, and an oil reservoir 24 for purposes hereinafter described. It should be understood that the vehicle 11 may be conventionally powered; however, a hydraulically operated vehicle similar to that described more fully in copending U.S. Pat. application S. N. 15,541, now U.S. Pat. No. 3,658,136 issued Apr. 25, 1972 is preferred.

An operator's station 26 (FIG. 1) is located on the forward portion of the chassis 12, forwardly of the engine enclosure 19. The operator's station 26 conventionally includes an operator's seat 27 from which the operator manipulates the various controls, such as the steering wheel 28, the throttle 29, the brakes 31, and the cutter controls 32 and 33.

The plant cutting apparatus 10 (FIGS. 1 and 2) further includes a cutter assembly 34 attached to and disposed forwardly of the vehicle 11. The cutter assembly is disposed transversely to the direction of travel of the vehicle 11 and generally includes a frame 36 pivotally connected to the tool bar 18 of the vehicle 11, a cutter bar unit 37 connected to the frame 36 and operably connected to a first motor unit 38, and a reel unit 39 connected to the cutter bar unit 37 and rotatably operated by a second motor unit 41.

The frame 36 (FIGS. 1 and 3) of the cutter assembly 34 includes a pair of laterally spaced rearwardly extended pivot bars 42 and 43 interconnected by a connecting bar 44. The pivot bars 42 and 43 are pivotally connected by pins 48 and 49, or the like, to arms 46 and 47 secured to the chassis 12 on either side thereof, and which are extended forwardly of the tool bar 18; whereby the pivot bars 42 and 43 are operable to pivot vertically about the chassis 12. A pair of main horizontally disposed support beams 51 and 52 are connected at their rearward ends 53 and 54 respectively, to the connecting bar 44 and extend forwardly thereof to connect to and support the cutter bar unit 37. A pair of diagonal horizontally disposed braces 56 and 57 interconnect the outer ends of the connecting bar 44 and the cutter bar 37 unit for lateral support.

The frame 36 further includes a pair of rearwardly extended brackets 58 and 59 (FIGS. 1 and 3) secured in laterally spaced relation to the rear side of the bar 44 intermediate to the ends, and each adapted to receive a height regulator and stabilizer unit 61 to position the cutter bar unit 37 relative to the growing plants 62 and ground 63. A manual regulator and stabilizer unit 61 is illustrated in FIG. 3 and includes an upright threaded guide 64 pivotally connected at its lower end 66 to an arm 67 extended forwardly from the front, underside of the chassis 12. The guide 64 extends through the bracket 58 or 59, and holds the bracket in a vertically adjusted, fixed position by a pair of nuts 68 and 70 located on opposite sides of the respective bracket.

While not shown, it is contemplated that a hydraulic cylinder and piston may replace the guide 64 arrangement to pivotally raise and lower the frame 36 and cutter bar unit 37, and stabilize the cutter assembly 34 in operating position. The hydraulic cylinder and piston may be connected to hydraulic hose 71 (FIG. 3) fluidly connected to a hollow tube 72 for transmitting fluid in the hydraulic system of the vehicle 11.

The cutter bar unit 37 (FIGS. 1 and 4) is conventional and includes an elongated stationary element 73 having a plurality of forwardly extended guards 74 attached thereto. A sickle blade or cutter bar 75 is slidably held in the guards 74 in front of the element 73, and is adapted for oscillating reciprocal movement. The cutter bar has a plurality of cutter blades 76 secured thereto in side-by-side arrangement for obtaining a scissoring-type relationship with the guards 74.

To reciprocate the cutter bar 75 (FIG. 4), a first motor unit 38 is provided. The motor unit 38 is connected to an end 78 of the element 73, and generally includes a motor 79, a housing 80, a cam 81 and a connecting arm 82. The motor 79 is preferably of the hydraulic variety and includes a pair of hoses 83 and 84 to fluidly connect the motor 79 to a power source (FIG. 6) of the vehicle 11, as hereinafter described. The motor 79 is operably connected to a rotatable shaft 86 by a conventional gear arrangement (not shown), or the like, enclosed within the housing 80. With the output shaft 86 operating to rotate the cam 81, and with the cam connected by the arm 82 to a projection 87 on the cutter bar 75, it may be readily seen that operation of the motor 79 results in reciprocation of the cutter bar 75.

The reel unit 39 (FIGS. 1 and 5) includes an elongated center shaft 91 connected at each end to one of a pair of cross-frames 92 and 93 extending radially therefrom. The cross-frames 92 and 93 are interconnected by a plurality of flat, straight planks connected in parallel relationship. The planks 94-97 serve to engage the undesired plants upon rotation of the shaft 91 and comb the plants toward the cutter bar 37.

The reel unit 39 (FIGS. 1, 2 and 5) further includes a pair of mounting posts 101 and 102 at each end thereof for adjustably supporting the center shaft 91. As each post arrangement is identical, only one will be described. Post 102 (FIG. 5) is slidably mounted in a sleeve 104 mounted on the element 73. An aperture 106 (FIG. 5) is formed in the element 73 directly below the sleeve 104 so the post 102 can be moved vertically through the element 73. The sleeve 104 is provided with a plurality of vertically spaced, diametrically aligned pairs 108 and 109 of holes, and these holes 108 and 109 can be aligned with adjacent sets of like holes 111, 112, 113, and 114 formed in the same manner in the post 102 so as to receive bolts 116 and 117, thereby securing the post 101 in a fixed position.

The posts 101 and 102 are curved to extend upwardly and forwardly from the bases 103 and 104 as best seen in FIG. 2, and each includes a hub 118 attached to the upper end thereof. The hub 118 is adapted to receive and rotatably mount the shaft 91 of the reel unit 39.

It may thus be seen that by appropriately vertically adjusting the posts 101 and 102 in their respective sleeves 103 and 104, the height of planks 94-97 relative to the cutter bar unit 37 may be adjusted to comb the undesired plants into the cutter bar 37.

To rotate the shaft 91 (FIGS. 1 and 5), a second motor unit 41 is provided. It includes a motor 121, preferably of the hydraulic variety, secured on a mounting plate 122 attached to post 102. The motor 121 is connected to a pair of hydraulic hoses 126 and 127 fluidly connected to a hydraulic power source situated on the vehicle 11, as explained hereinafter.

Referring now to FIG. 6, a schematic diagram illustrating the hydraulic power system 128 of the vehicle 11 and connection and operation of the motors 79 and 121 is shown. The power system 128 includes a hydraulic pump 22 operated by the engine 21 for forcing hydraulic fluid under pressure through the conduits 129 and 130 as indicated by arrows. The cutter bar motor 79 is fluid connected to conduit 130 by hose 83 for operation, and the fluid exits the motor 79 by hose 84 and connects to a return conduit 131. Attached to the return conduit 131 is an on-off valve 132 operable to activate or de-activate the motor 79 by opening or closing, respectively, the conduit 131. A restrictive valve 133 is fluidly connected to valve 132 by connecting conduit 134 and serves to restrict the flow of fluid through the motor 79, thereby regulating its speed of rotation and the oscillating rate of the sickle blade 75. From valve 133, the fluid returns to the reservoir 24 by conduit 135.

Similarly, motor 121 is operably connected to the conduit 130 by a hose 126 for hydraulic operation with the fluid exiting the motor 121 through a hose 127. The hose 127 is connected to by a return conduit 136 to a second on-off valve 137 operable to activate or deactivate the motor 121 similarly to the valve 132, as hereinbefore described. A second restrictive valve 138 is fluidly connected to the valve 137 by conduit 139 and serves to regulate the speed of rotation of motor 121, thereby regulating the rate of rotation of the reel unit 39. The valve 138 is fluidly connected to the conduit 135 for return to the reservoir 24 and recirculation.

It should be recognized that the hydraulic power system 128 hereinbefore described is merely illustrative of a manner to operate motors 79 and 121, and any hydraulic system operable to independently operate motors 79 and 121 would suffice for operation of the invention.

In operation, the height of the cutter bar unit 37 is adjusted and fixed relative to the tops of the growing crop plants 62 by appropriately manipulating the regulating the stabilizing unit 61. Generally, the cutter bar unit 37 is positioned about one to three inches above the average height of the growing crop plants 62 (FIG. 2) to provide sufficient spacing therebetween to provide for a particularly fertile area in the field where the plants 62 may be somewhat taller. For example, should the desired plants 62 be approximately 15 inches tall at the time of the cutting operation, the cutter bar unit 37 would be set approximately 18 inches above the ground 63.

Once the cutter bar unit 37 is positioned, the distance between the reel unit 39 and cutter bar 75 is adjusted by appropriate vertical movement of the posts 101 and 102. Should the undesired plants be of a particularly fast growing genus, such as sunflower, the reel unit 39 is raised to enable the rotating plank members 94-97 to overlap the tops thereof and draw the plants into the cutter bar 75. The reverse procedure would be indicated if the undesired plants were of a smaller variety to enable the plank members 94-97 to intercept the plants a sufficient distance forward of the cutter bar 75.

The desired speed of the cutter bar 75 is determined by the growth and kind of plants or weeds growing in the field. Thus, if the plants were of a thick stemmed variety, i.e., volunteer corn, the speed of the bar 75 would be slowed down to compensate for the thick cut necessary. This type of plant is a normally sparsely growing plant, such that rarely more than three plants ever engage the cutter bar simultaneously. Likewise, should the field contain abundantly growing thin stemmed plants, the speed of the cutter bar is increased.

The rotational speed of the reel unit 34 is likewise regulated according to the abundance or sparceness of the undesired plant growth and the variety thereof. Thus, if the growth is abundant and of a small stemmed variety, the rotation of the reel unit 34 is increased to bring more plants into the cutter bar 75 and to clear the cutter bar 75 for receiving additional plants to be cut. However, if the plant growth is rather sparse and the principle undesired plant is of the thick stemmed variety, a slower rotation is desired since it is the intention of this invention to cut, rather than break off the undesired plants.

Although a preferred embodiment of the plant cutting apparatus of this invention has been hereinbefore described, it is to be remembered that various modifications can be made thereto without departing from the invention as hereinafter defined.

I claim:

1. A plant cutting apparatus for cutting undesired plants extending above a growing crop, the apparatus comprising:

a self-propelled vehicle having a forwardly mounted tool bar;

a frame pivotally connected to said tool bar;

a cutter bar unit connected to said frame and extending transverse to the direction of travel of said vehicle, said cutter bar including a reciprocal blade, said blade disposed normally in a horizontal plane common with said tool bar;

a first power means mounted on said cutter bar unit for reciprocally moving said blade;

a vertically adjustable reel unit mounted on said cutter bar unit and including a rotatable reel;

a second power means mounted on said reel unit and operatively connected to said reel for rotating said reel; and adjusting means interconnecting the vehicle and said frame for selectively adjusting the height of said blade relative to the growing crop.

2. A plant cutting apparatus as defined in claim 1 wherein said vehicle includes a hydraulic system, operably connectable to said first and second power means, said hydraulic system including individual controls for selectively and independently regulating the operation and speed of said blade and said reel.

3. A plant cutting apparatus as defined in claim 1, and further wherein said reel unit includes a plurality of parallel, acruately spaced planks rotatably mounted about an axis above said blade, with rotation of said reel unit operable to move the tops of the plants toward said cutter bar unit.

* * * * *